(12) United States Patent
Struye et al.

(10) Patent No.: US 6,479,835 B1
(45) Date of Patent: Nov. 12, 2002

(54) RADIATION IMAGE DETECTOR

(75) Inventors: Luc Struye, Mortsel (BE); Paul Leblans, Kontich (BE)

(73) Assignee: Agfa-Gevaert, Mortsel (BE)

( * ) Notice: Subject to any disclaimer, the term of this patent is extended or adjusted under 35 U.S.C. 154(b) by 88 days.

(21) Appl. No.: 09/595,505

(22) Filed: Jun. 16, 2000

Related U.S. Application Data

(60) Provisional application No. 60/159,004, filed on Oct. 8, 1999, and provisional application No. 60/142,276, filed on Jul. 2, 1999.

(51) Int. Cl.⁷ .............................................. G01N 23/04
(52) U.S. Cl. ..................... 250/584; 250/484.4
(58) Field of Search ................. 250/585, 581, 250/582, 583, 584, 586, 591, 484.2, 484.3, 484.4

(56) References Cited

U.S. PATENT DOCUMENTS

| | | |
|---|---|---|
| 4,605,861 A * | 8/1986 | Nakamura et al. ....... 250/484.4 |
| 5,028,509 A | 7/1991 | Shimada et al. |
| 5,208,459 A * | 5/1993 | Morrone et al. ............ 250/585 |
| 5,723,865 A * | 3/1998 | Trissel et al. ............... 250/368 |

FOREIGN PATENT DOCUMENTS

| | | | |
|---|---|---|---|
| EP | 0 174 875 | 6/1990 | |
| JP | 2-085799 A * | 3/1990 | ............... 250/484.4 |

* cited by examiner

*Primary Examiner*—Constantine Hannaher
*Assistant Examiner*—Albert Gagliardi
(74) *Attorney, Agent, or Firm*—John A. Merecki; Hoffman, Warnick & D'Alessandro

(57) ABSTRACT

A radiation image detector wherein a photostimulable phosphor screen, a source of stimulating light and an array of transducer elements are enclosed within an enclosure that is hermetically closed against humidity. In one embodiment the enclosure is flushed with an inert gas such as $N_2$ gas.

10 Claims, 1 Drawing Sheet

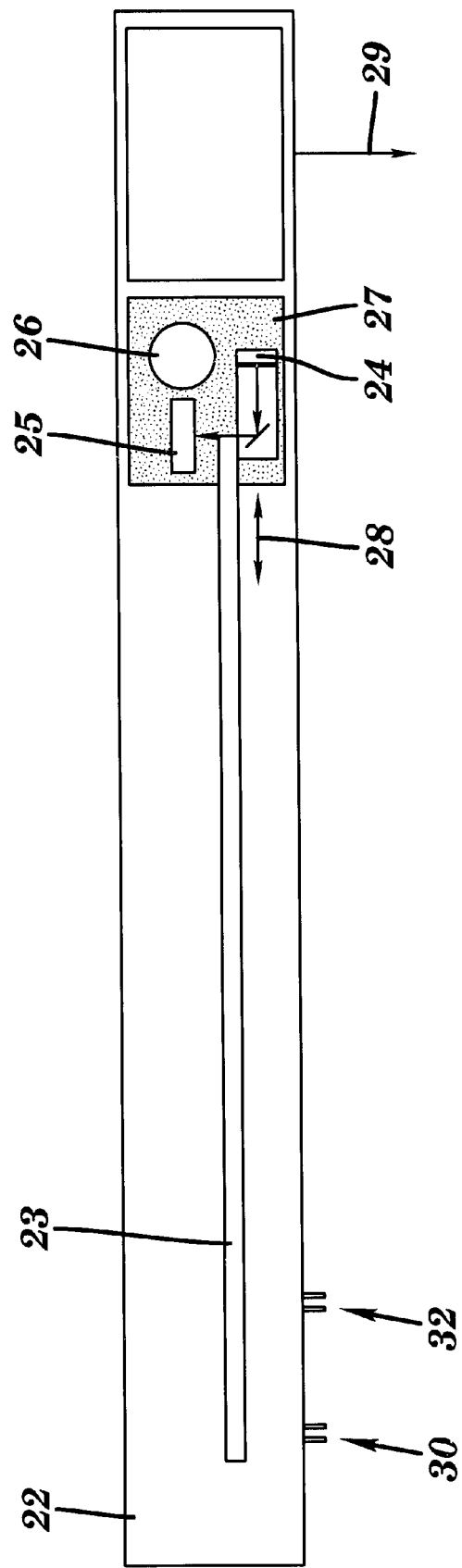

RADIATION IMAGE DETECTOR

This application claims benefit of Provisional Applications No. 60/159,004 filed Oct. 8, 1999 and 60/142,276 filed Jul. 2, 1999.

FIELD OF THE INVENTION

The present invention relates to digital radiography and relates more specifically to a system wherein a radiation image is temporarily stored in a photostimulable phosphor screen.

BACKGROUND OF THE INVENTION

Radiation image recording systems wherein a radiation image is recorded on a photostimulable phosphor screen by exposing said screen to image-wise modulated penetrating radiation are widely used nowadays.

The recorded image is reproduced by stimulating the exposed photostimulable phosphor screen by means of stimulating radiation and by detecting the light that is emitted by the phosphor screen upon stimulation and converting the detected light into an electrical signal representation of the radiation image.

Screens which are suitable for this application comprise e.g. a BaFX: $Eu^{2+}$ phosphor or a divalent europium activated cesium halide phosphor wherein the halide is at least one of chloride and bromide or the like. The phosphor is deposited on top of a support layer such as a plastic film.

Some phosphors among which the above mentioned cesium halide phosphor are stable at normal temperature and humidity conditions but tend to be hygroscopic at high temperature and high humidity.

If a hygroscopic phosphor is exposed to moisture at elevated temperatures, the phosphor degrades. As a consequence sensitivity decreases. Since it is desirable that a radiographic system remains stable and has a long lifetime in all environmental conditions thus also in a hot and humid environment the above effects are unacceptable.

The most obvious way to avoid problems resulting from humidity is to coat the phosphor layer with a protective layer. However, it is common knowledge that such a protective layer leads to light piping. As a consequence of this effect the resolution of the screen degrades. This negative effect occurs even in case the protective layer is as thin as 10 micrometer.

OBJECTS OF THE INVENTION

It is an object of the present invention to provide a radiation detector wherein a radiation image is temporarily stored in a photostimulable phosphor screen that is stable and has a long life time under severe conditions regarding humidity and temperature.

Further objects of the present invention will become apparent from the description hereafter.

SUMMARY OF THE INVENTION

The above mentioned objects are realised by a radiation detector having the specific features defined in claim 1.

The inventors have found that high temperature on its own does not damage the system nor shorten its life cycle. Only the combination of high temperature together with high humidity degrades the screen.

The degradation is eliminated according to the present invention by providing a radiation detector comprising in addition to a phosphor screen the means for reading the radiation image from the screen and for occasionally erasing the screen. This detector is additionally provided with means for preventing humidity to enter the detector.

The phosphor screen is not taken out of the detector. It remains inside the enclosure of the detector during the exposure of the system to image-wise modulated radiation originating from irradiation of an object or a patient as well as during read out of the radiation image from an exposed screen and during occasional erasure of the screen between successive exposures.

According to one embodiment of the invention the detector is flushed by means of an an inert gas such as $N_2$ gas, Ar gas, dried air or the like.

The gas may be circulated inside the system so that only a small quantity of the gas is needed.

Alternatively it can be pumped into the detector at one location and released at another location.

Specific features for preferred embodiments of the invention are set out in the dependent claims.

Further advantages and embodiments of the present invention will become apparent from the following description and drawings.

BRIEF DESCRIPTION OF THE DRAWINGS

The FIGURE shows a radiation detector according to the present invention.

DETAILED DESCRIPTION OF THE INVENTION

An embodiment of a detector according to the present invention is shown in the FIGURE.

The detector comprises an enclosure (22).

Within the enclosure a photostimulable phosphor screen (23) is positioned. This screen for example comprises a divalent cesium halide phoshor, wherein said halide is at least one of chloride and bromide.

The enclosure further comprises a source of stimulating light (24) arranged for stimulating said phosphor screen and an array of transducer elements (25) for capturing light emitted by the phoshor upon stimulation and for converting said light into an electrical signal representation.

In the illustrated embodiment the source of stimulating light is implemented as a linear light source (more specifically an array of laser diodes) and the array of transducer elements is also a linear array (more specifically an array of charge coupled device elements). This embodiment can be made very compact and provides fast read out.

The enclosure further comprises a linear erasing light source (26) arranged substantially parallel to the stimulating light source.

The enclosure still further comprises means (not shown) for transporting the assembly (27) of stimulating light source, erasing light source and array of transducer elements relative to the phosphor screen in a so-called sub-scan direction, indicated by arrow (28).

Means (29) are further provided for communicating the electrical signal representation output by the array of transducer elements to an external signal processing device.

In this re-usable radiation detector the phosphor screen remains inside the enclosure during irradiation, read out and erasure.

To guarantee a low humidity the detector is flushed with N2. The gas is pumped out of a common recipient such as a gas cylinder into a first opening (30) in the enclosure (22). The gas is released into the air through a second opening (32) in enclosure (22).

In this embodiment the stimulating light source and the array of transducer elements are arranged on opposite sides of the phosphor screen. In alternative embodiment these items may be arranged on the same side of the phosphor screen.

The stimulable phosphor screen in the several embodiments of the present invention comprises a divalent europium activated cesium halide phosphor. Such a phosphor is known in the art and has for example been disclosed in EP-A-174 875 (and U.S. Pat. No. 5,028,509). The phosphor is especially well suited for manufacturing 'binderless' phosphor screens. Binderless phosphor screens provide optimal sharpness.

It is advantageous however to use a CsX:Eu phosphor wherein X represents a halide selected from the group consisting of Br and Cl, which is obtained by the following method:

mixing CsX with between $10^{-3}$ and 5 mol % of a Europium compound selected from the group consisting of $EuX'_2$, $EuX'_3$ and $EuOX'$, X' being a member selected from the group consisting of F, Cl, Br and I, firing the mixture at a temperature above 450° C.

cooling said mixture and recovering the CsX:Eu phosphor.

A phosphor that has been obtained as a result of the above method of preparation has an increased conversion efficiency compared to the state of the art divalent europium activated cesium halide phosphor. The phosphor can be stimulated by means of a lower amount of stimulation energy.

A photostimulable phosphor screen using such a phosphor is preferably obtained by the method of preparing said CsX:Eu phosphor by firing a mixture of said CsX with between 10–3 and 5 mol % of an Europium compound selected from the group consisting of $EuX'_2$, $EuX'_3$ and $EuOX'$, X' being a halide selected from the group consisting of F, Cl, Br and I and applying said phosphor on a substrate by a method selected from the group consisting of physical vapor deposition, thermal vapor deposition,, chemical vapor deposition, radio frequency deposition and pulsed laser deposition.

This method of preparation is advantageous because it allows to deposit the phosphor in the form of needle-shaped crystals. These needle-shaped phosphor crystals act as light guides so that they reduce the lateral spreading of light in the phosphor layer. Reduced lateral light spread leads to images of higher resolution.

Alternatively a phosphor screen containing a CsX:Eu stimulable phosphor, wherein X represents a halide selected from the group consisting of Br and Cl can also be manufactured by performing the steps of:

bringing multiple containers of said CsX and an Europium compound selected from the group consisting of $EuX'_2$, $EuX'_3$ and $EuOX'$, X' being a halide selected from the group consisting of F, Cl, Br and I in condition for vapor deposition and depositing, by a method selected from the group consisting of physical vapor deposition, thermal vapor deposition, , chemical vapor deposition, electron beam deposition, radio frequency deposition and pulsed laser deposition, both said CsX and said Europium compound on a substrate in such a ratio that on said substrate a CsX phosphor, doped with between $10^{-3}$ and 5 mol % of an Europium compound, is formed.

This method of preparation is advantageous because it likewise allows to deposit the phosphor in the form of needle-shaped crystals. These needle-shaped phosphor crystals act as light guides so that they reduce the lateral spreading of light in the phosphor layer. Reduced lateral light spread leads to images of higher resolution.

The above decribed phosphor and photostimulable phosphor screen have been described extensively in the following U.S. provisional applications that are incorporated herein by reference: 60/159,004 and 60/142,276.

What is claimed is:

1. A radiation age detector comprising a photostimulable phosphor screen, at least one source of stimulating light arranged for stimulating said phosphor screen, an array of transducer elements arranged for capturing light emitted by the phoshor screen upon stimulation and for converting said light into an electrical signal representation of said image, an enclosure enclosing said photostimulable phosphor screen, said assembly of stimulating light source and said array of transducer elements, interfacing means for communicating said electrical signal representation to an external signal processing device, means for preventing humidity from entering said enclosure. including means for flushing said enclosure with an inert gas.

2. A radiation image detector according to claim 1 wherein said inert gas is $N_2$.

3. A radiation image detector according to claim 1 wherein said enclosure comprises a gas inlet arranged for coupling to a gas container and a gas outlet.

4. A radiation image detector according to claim 1 wherein said means for flushing said enclosure with inert gas comprise means for circulating said gas inside said enclosure.

5. A detector according to claim 1 wherein said stimulating light source is a linear array of laser diodes.

6. A detector according to claim 1 wherein said array of transducer elements is a linear array of charge coupled device elements.

7. A detector according to claim 1 wherein said phosphor screen comprises a divalent europium activated cesium halide phosphor wherein said halide is at least one of chloride and bromide.

8. A detector according to claim 1 wherein said photostimulable phosphor screen is obtained by the following steps:

mixing CsX with between $10^{-3}$ and 5 mol % of a Europium compound selected from the group consisting of $EuX'_2$, $EUX'_3$ and $EuOX'$, X' being a halide selected from the group consisting of F, Cl, Br and I, firing the mixture at a temperature above 450° C.

cooling said mixture and recoving the CsX:Eu phosphor.

9. A detector according to claim 1 wherein said phosphor screen is obtained by the steps of preparing said CsX:Eu phosphor by firing a mixture of said CsX with between $10^{-3}$ and 5 mol % of an Europium compound selected from the group comsisting of $EuX'_2$, $EuX'_3$ and $EuOX'$, X' being a halide selected from the group consisting of F, Cl, Br and I and applying said phosphor on a substrate by a method selected from the group consisting of physical vapour deposition, thermal vapour deposition, chemical vapour deposition, radio frequency deposition and pulsed laser deposition.

10. A detector according to claim 1 wherein said phosphor screen is obtainable by the steps of bringing multiple containers of said CsX and an Europium compound selected from the group consisting of $EuX'_2$, $EuX'_3$ and $EuOX'$, X' being a halide selected from the group consisting of F, Cl, Br and I in condition for vapour deposition and depositing, by a method selected from the group consisting of physical vapour deposition, thermal vapour deposition, chemical vapour deposition, electron beam deposition, radio frequency deposition and pulsed laser deposition, both said CsX and said Europium compound on a substrate in such a ratio that on said substrate a CsX phosphor, doped with between $10^{-}$ and 5 mol % of an Europium compound, is formed.

\* \* \* \* \*

UNITED STATES PATENT AND TRADEMARK OFFICE
Certificate

Patent No. 6,479,835 B1                                  Patented: November 12, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Luc Struye, Mortsel, Belgium; Paul Leblans, Kontich, Belgium; Martin Devenney, Santa Clara, CA; and Casper Reaves, Santa Clara, CA.

Signed and Sealed this Thirteenth Day of April 2004.

DAVID P. PORTA
*Supervisory Patent Examiner*
Art Unit 2878